B. LEWIS.
Chucks for Metal-Lathes.
No. 151,298. Patented May 26, 1874.
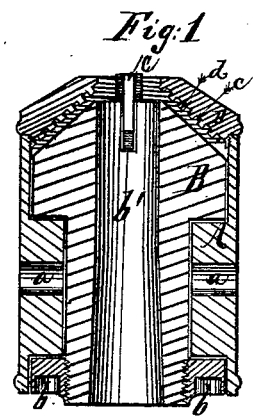
Fig. 1
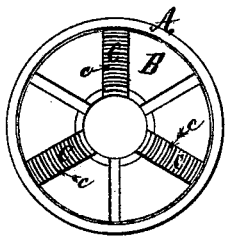
Fig. II.
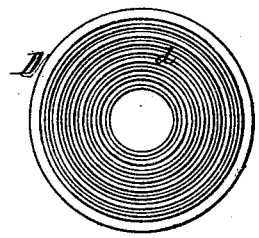
Fig. III.
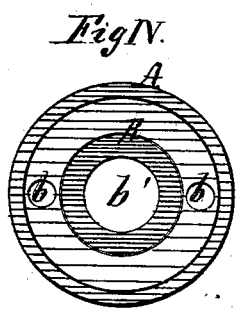
Fig. IV.
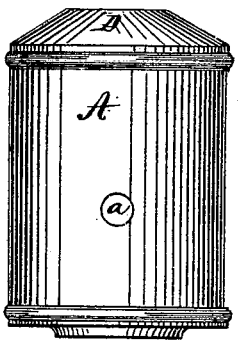
Fig. V.
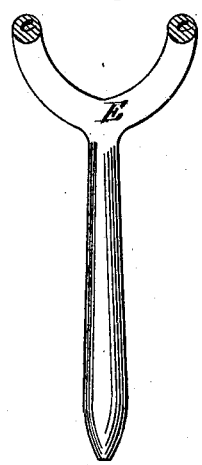
Fig. VI.
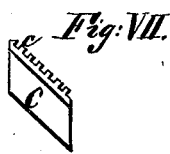
Fig. VII.
Witnesses:
Franklin Barritt
Richard Gerner
Inventor:
Barber Lewis,
Per Henry Gerner.
Atty.

UNITED STATES PATENT OFFICE.

BARBER LEWIS, OF PUTNAM, CONNECTICUT.

IMPROVEMENT IN CHUCKS FOR METAL LATHES.

Specification forming part of Letters Patent No. 151,298, dated May 26, 1874; application filed April 28, 1874.

*To all whom it may concern:*

Be it known that I, BARBER LEWIS, of Putnam, Windham county, State of Connecticut, have invented a new and useful Improvement in Lathe-Chucks; and I hereby declare the following to be a full and clear description of the same.

The object of this invention is to produce a chuck which will gripe and hold the specimen to be operated upon by means of a series of followers, simultaneously expelled from the periphery toward the center and upon the specimen, and so arranged as to be also simultaneously withdrawn from their hold upon the specimen, the advance or retrograde movement being directed by means of screw-threads cut upon the said followers, and also upon that part of the shell or case of the chuck which will be next adjacent to the said threads of the followers when the parts are collected.

The arrangement of the parts will be more readily understood by reference to the accompanying drawings, of which—

Figure I is a longitudinal sectional plan of the entire chuck. Fig. II is an elevation of the front end of the chuck with its movable cap-piece removed so as to disclose the followers in place. Fig. III is a plan of the interior of the movable cap-piece, showing the threads of the screw that operates the followers. Fig. IV is a plan of the rear end of the chuck, showing the holes for the insertion of the wrench that turns the parts so as to throw the followers out or back. Fig. V is an outside elevation of the entire chuck fully collected and ready for use. Fig. VI is a plan of the wrench that operates the parts so as to move the followers. Fig. VII is a plan of one of the followers.

The outer shell of the chuck is an annular case, A, the sides of which are perforated with mortises $a$, for the insertion of a wrench or lever bar to hold the case when the followers are being screwed either in or out of position upon the specimens. Within the shell A is another annular piece, B, which fits tightly to A, but is allowed to turn easily therein by means of a wrench, as hereafter described. The forward end of this piece B is conically-shaped, and slotted to receive the followers, as is shown in Figs. I and II. The other end of the piece B shows the arrangement for the application of the wrench to that piece to turn it in its socket. This is shown clearly in Fig. IV, where the said wrench-holes are lettered $b$. The followers C are, as shown in Fig. VII, somewhat of a diamond shape in plan, and a T shape in section, as shown in Fig. I. The blade of the follower is placed in a slot or groove in the piece B, and is fitted so as to slide easily therein, while its flanges rest on the conical end of B, and slide thereon as they are screwed from one position to another. The outer side of the head or flanged part of the followers C have screw-threads $c$, which are made to fit into the threads $d$ on the inner side of the conical cap-piece D, the said cap-piece being screwed to the annular case A when the parts are collected and held firmly thereon. The aperture $b'$ through the center of B permits the specimens to be operated upon to be entered therein, so as to be caught by the inner ends of the followers, which, when thrown back, do not extend outside of the edges of their seats in B, so as to be out of the way of the specimen when it is entered. The front edges of the followers are made concave, as shown in Fig. II, so as to have their sharp corners, which are thus constructed, impinge tightly upon the specimen to hold it firmly in the chuck.

All the parts of the chuck being assembled as above described, the piece to be held is to be inserted in the central aperture of the chuck, and then the wrench E will be placed on the back end of the chuck with its lugs $e$ in the mortises $b$, above alluded to, while the outer case is held by means of a wrench-bar in $a$, and then, by turning the piece B with its followers forward, the said followers will be forced toward the center, and onto the piece to be held by means of their screw-threads $c$ being worked forward in the threads $d$.

It will be seen that all of the followers in the above arrangement move forward simultaneously, and with exactly the same amount of motion, so that they are always perfectly centered, and in withdrawing them their movement is equally in harmony.

I am aware that Patent No. 56,329, granted to Isaac Smith July 10, 1866, describes a chuck similar to mine, in that the jaws are screw-threaded, and are projected and retracted by the action upon them of a conical screw; but in other respects my device differs essentially, the jaws being threaded on their external surface, and the screw for operating them being on the interior surface of a conical cap that surrounds them, in virtue of which the chuck is made hollow axially throughout its whole extent, which permits the insertion of the article to be operated on to a greater or less extent, as may be desired.

What I claim is—

The combination of the hollow stock B, case A, externally-threaded jaws C, and the internally-threaded conical cap D, as set forth.

BARBER LEWIS.

Witnesses:
JAMES N. MANNING,
WESLEY WILSON.